(12) United States Patent
Yüksel et al.

(10) Patent No.: US 11,745,885 B2
(45) Date of Patent: Sep. 5, 2023

(54) METHOD FOR OPERATING AN AIRCRAFT, FLIGHT CONTROL DEVICE FOR AN AIRCRAFT, AND AIRCRAFT HAVING MULTIPLE DRIVE UNITS

(71) Applicant: Volocopter GmbH, Bruchsal (DE)

(72) Inventors: Burak Yüksel, Heidelberg (DE); Johannes Stephan, Stuttgart (DE); Benjamin Kirsch, Heidelberg (DE)

(73) Assignee: Volocopter GmbH, Bruchsal (DE)

( * ) Notice: Subject to any disclaimer, the term of this patent is extended or adjusted under 35 U.S.C. 154(b) by 0 days.

(21) Appl. No.: 17/485,671

(22) Filed: Sep. 27, 2021

(65) Prior Publication Data
US 2022/0097828 A1 Mar. 31, 2022

(30) Foreign Application Priority Data
Sep. 25, 2020 (DE) .......................... 102020125095.9

(51) Int. Cl.
*B64D 31/00* (2006.01)
*B64D 31/06* (2006.01)
(Continued)

(52) U.S. Cl.
CPC ............. *B64D 31/06* (2013.01); *B64D 27/24* (2013.01); *G05D 1/0858* (2013.01)

(58) Field of Classification Search
CPC .. G06F 21/79; G06F 21/86; G06F 2221/2129; G06F 1/1626; G06F 12/0866;
(Continued)

(56) References Cited

U.S. PATENT DOCUMENTS 3,752,011 A   8/1973  Casey et al.
3,989,208 A   11/1976 Lambregts
(Continued)

FOREIGN PATENT DOCUMENTS

AU      4685672 A    4/1974
CN    105599894 A    5/2016
(Continued)

OTHER PUBLICATIONS

Search Report for corresponding Chinese Application No. 202111122411.4 dated Jun. 9, 2023, 11 pages long.

*Primary Examiner* — Ian Jen
(74) *Attorney, Agent, or Firm* — Volpe Koenig

(57) ABSTRACT

A method for operating an aircraft having multiple drive units including: a) providing a first flight control unit (CTRL-1), which activates the drive units according to a first control implementation when CTRL-1 is active; b) providing a second flight control unit (CTRL-2), which activates the drive units according to a second control implementation when CTRL-2 is active; c) continuously monitoring a function of the currently active flight control unit (CTRL-1); d) changing the active flight control unit from the currently active flight control unit (CTRL-1) to the newly active flight control unit (CTRL-2) in dependence on a result of the monitoring in step c); in which the change in step d) for the newly active flight control unit (CTRL-2) includes: d1) initializing starting values of a movement equation of the aircraft implemented in CTRL-2 using currently known state values (x) of the aircraft; d2) initializing integrators of CTRL-2 using control commands for the drive units from CTRL-1; d3) difference equalization between control commands ($u_1$) for the drive units from CTRL-2 and control commands ($u_2$) for the drive units from CTRL-2.

18 Claims, 2 Drawing Sheets

(51) Int. Cl.
*B64D 27/24* (2006.01)
*G05D 1/08* (2006.01)

(58) Field of Classification Search
CPC .... G06F 2212/2022; G06F 3/12; G06F 15/00;
G06F 7/57; G06F 9/226; G06F 9/265;
G06F 9/30094; G06F 9/30101; G06F
9/3885; G06K 1/121; G06K 19/06037;
G06K 7/14; G06K 7/1417; G06K 19/073;
G06K 7/10722; G06K 19/06; G06K 7/10;
G06K 15/00; G06K 13/00; G06K 19/00;
G06K 1/12; G06K 7/10732; G06K
7/10762; G06K 7/1443; G06K
2215/0002; G06K 19/06046; B82Y 30/00
See application file for complete search history.

(56) References Cited

U.S. PATENT DOCUMENTS

| | | | |
|---|---|---|---|
| 5,722,620 A | 3/1998 | Najmabadi et al. | |
| 2008/0147254 A1 | 6/2008 | Vos | |
| 2008/0296438 A1 | 12/2008 | Wong et al. | |
| 2013/0037658 A1 | 2/2013 | Goelling | |
| 2017/0160749 A1 | 6/2017 | Torralba | |
| 2017/0349267 A1 | 12/2017 | Venkataraman et al. | |
| 2017/0361869 A1 | 12/2017 | Hales | |
| 2019/0243371 A1* | 8/2019 | Nister | B60W 30/095 |
| 2020/0103922 A1 | 4/2020 | Nonami et al. | |

FOREIGN PATENT DOCUMENTS

| | | |
|---|---|---|
| CN | 105700615 A | 6/2016 |
| CN | 108536159 A | 9/2018 |
| CN | 108693887 A | 10/2018 |
| CN | 109743889 A | 5/2019 |
| CN | 111487987 A | 8/2020 |
| DE | 69814971 | 12/2003 |
| DE | 60101928 | 1/2005 |
| DE | 102010040770 | 8/2012 |
| DE | 102008022895 | 5/2017 |
| DE | 102016115485 | 2/2018 |
| GB | 1340719 A | 12/1973 |
| GB | 1442822 A | 7/1976 |
| JP | 2000298501 A | 10/2000 |
| JP | 2017007588 A | 1/2017 |
| JP | 2020064387 A | 4/2020 |
| WO | 03040844 A2 | 5/2003 |
| WO | 2010138236 A2 | 12/2010 |

* cited by examiner

METHOD FOR OPERATING AN AIRCRAFT, FLIGHT CONTROL DEVICE FOR AN AIRCRAFT, AND AIRCRAFT HAVING MULTIPLE DRIVE UNITS

INCORPORATION BY REFERENCE

The following documents are incorporated herein by reference as if fully set forth: German Patent Application No. 10 2020 125 095.9, filed Sep. 25, 2020.

TECHNICAL FIELD

The application relates to a method for operating an aircraft having multiple drive units.

Furthermore, the application relates to a flight control device for an aircraft having multiple drive units and aircraft having such drive units.

BACKGROUND

The applicant is a producer of electrically driven multi-rotor VTOL aircraft, wherein the abbreviation VTOL stands for vertical takeoff and landing. However, the usability of the present invention is not restricted in principle to aircraft having multiple drive units, but can also relate to other systems, such as plants or robots, which have a plurality of actuators. The drive units in the mentioned aircraft are ultimately only one special embodiment of such actuators.

Aircraft of the mentioned type have a flight control unit, which activates the drive units according to a control implementation, which control implementation contains a specific software or circuitry implementation of a flight control law, wherein this is ultimately a physically motivated system of formulas or an equation or a system of equations, with the aid of which control specifications of a human pilot or an autopilot may be converted or transferred into a desired physical state of the aircraft. The mentioned flight control law calculates corresponding so-called pseudo-control commands for the drive units of the aircraft, which are subsequently converted by a so-called allocation algorithm into actual control commands for the drive units. This is all explained in more detail below, but is already known as such to a person skilled in the art.

The mentioned actual control commands are subsequently used to activate the drive units in such a way that a state of the aircraft is achieved which—within permissible parameter specifications—corresponds to the greatest possible extent to the control command of the human pilot or the autopilot.

In practice, it can be necessary for a specific control implementation, that is to say to pass over from a specific flight control law to another control implementation, that is to another flight control law if, for example, the monitoring of the flight behavior of the aircraft has the result that a presently, that is to say currently used flight control law does not supply the desired results. In this context, keeping ready multiple different flight control laws or corresponding implementations in the same aircraft is known in order to avoid accidents and increase the level of safety of the overall system. If one flight control law does not operate properly in the case of such an embodiment, it is possible to change to another flight control law. It is regularly necessary here to ensure a smooth transition from one flight control law to another flight control law, which is not trivial, however.

One practice previously known from the prior art is the continuous synchronization of the existing flight control laws and their internal states, for example, the integrators regularly provided in the corresponding control systems. It is considered to be disadvantageous here in particular that a continuous synchronization between two flight control laws or flight control units which implement the mentioned laws implies the possibility of error propagation. For example, if flight control unit 1 is continuously synchronized with flight control unit 2 and a change then takes place from flight control unit 1 to flight control unit 2, it can be the case that flight control unit 2 was "infected" with an error occurring in flight control 1 due to the progressing synchronization, which error would finally have the result that the control over the aircraft would be transferred to flight control unit 2. This can have the result that subsequently the operation of the aircraft under the aegis of flight control unit 2 does not result in the desired flight behavior, which can have catastrophic results.

SUMMARY

The invention is based on the object of providing a method for operating an aircraft having multiple drive units, in which a stable and smooth transition from one control implementation to another control implementation is possible, without error propagation being able to occur.

It is also the object of the present invention to specify a corresponding flight control device and a correspondingly designed or operated aircraft.

The mentioned object is achieved according by a method having one or more of the features disclosed herein, by a flight control device having one or more of the features disclosed herein related to the flight control device, and by an aircraft having one or more of the features disclosed herein. Advantageous refinements are defined below and in the claims.

A method according to the invention for operating an aircraft having multiple drive units includes a) providing at least one first flight control unit, which activates the drive units according to a first control implementation when the first flight control unit is active; b) providing at least one second flight control unit, which activates the drive units according to a second control implementation when the second flight control unit is active; c) continuously monitoring a function of the currently active flight control unit; d) changing the active flight control unit from the currently active flight control unit to the newly active flight control unit in dependence on a result of the monitoring in step c); in which the change in step d) for the newly active flight control unit includes: d1) initializing starting values of a movement equation of the aircraft implemented in the newly active flight control unit using currently known state values of the aircraft, preferably once at the time of the change; d2) initializing integrators of the newly active flight control unit using control commands for the drive units from the currently active flight control unit, preferably once at the time of the change; d3) difference equalization between control commands for the drive units from the currently active flight control unit and control commands for the drive units from the newly active flight control unit, preferably continuously from the time of the change, most preferably with weighting decreasing over time.

A flight control device according to the invention for an aircraft having multiple drive units includes: a) at least one first flight control unit, which is designed to activate the drive units according to a first control implementation when the first flight control unit is active; b) at least one second flight control unit, which is designed to activate the drive units according to a second control implementation when the second flight control unit is active; c) a monitoring unit for continuously monitoring a function of the currently active first or second flight control unit; d) at least one control-engineering implementation for changing the active flight control unit from the currently active flight control unit to the newly active flight control unit in dependence on a monitoring result of the monitoring unit; in which the control-engineering implementation includes: d1) a first implementation block, which is designed to initialize starting values of a movement equation of the aircraft implemented in the newly active flight control unit using currently known state values of the aircraft, preferably once at the time of the change; d2) a second implementation block which is designed to initialize integrators of the newly active flight control unit using control commands for the drive units from the currently active flight control unit, preferably once at the time of the change; d3) a third implementation block, which is designed for a difference equalization between control commands for the drive units from the currently active flight control unit and control commands for the drive units from the newly active flight control unit, preferably continuously from the time of the change, most preferably with weighting decreasing over time.

An aircraft according to the invention having multiple drive units has a flight control device according to the invention or is operated according to the method according to the invention.

In contrast to the prior art, the present method according to the invention does not include continuous synchronization of the at least two flight control units, but rather proposes, with specified steps d1) to d3) in delimitation from the prior art, a stable and smooth transition from one control implementation to another control implementation in that the reference or starting values and the integrator values of the second controller or the second flight control unit, i.e., the flight control unit which is to be activated or which is to be switched over to, are initialized, preferably in each case once at the time of the change. Moreover, the proposed difference equalization ensures a smooth transition of the control command (motor command), which is important in particular in the case of overdetermined multirotor aircraft, in particular from the company of the applicant, in particular if they use different allocation methods for various control laws (control implementations).

In this way, a smooth transition from one flight control law (one control implementation) to another control law (another control implementation) is possible, for example, from a primary flight control unit to a secondary flight control unit, without a synchronization between two flight control laws being required for this purpose.

To facilitate the comprehension of the present invention, first the physical background of systems, in particular aircraft, in which such (flight) control laws can be used will now be explained in more detail.

The movement equations of such a system can be derived, for example, with the aid of the Newton-Euler principal or the Lagrange method:

$$M(x)\ddot{x}+c(x,\dot{x})+g(x)+G(x)u_p=w_{ext}, \quad \text{Equation (1)}$$

wherein $x \in \mathbb{R}^n$ is the n-dimensional configuration vector of the system, for example, position and rotation in 3D, $M(x) \in \mathbb{R}^{n \times n}$ specifies the state-dependent generalized moment of inertia, $M(x) \in \mathbb{R}^{n \times n}$ denotes the state-dependent Coriolis forces (or other internal velocity-dependent forces), $g(x) \in \mathbb{R}^n$ stands for the gravitation forces, and $w_{ext} \in \mathbb{R}^n$ symbolizes the external forces and torques, for example, due to aerodynamics, contact, etc., which act on the states defined by the selected generalized coordinates. A pseudo-control input $u_p \in \mathbb{R}^m$ is defined, which is used to control the system. This pseudo-control input (in VTOL Multiactuator Aerial Vehicles (MAV) it comprises the collective thrust and the torques which act on the aircraft thanks to the actuators) is entered in the system dynamics specified in equation 1 using a control input matrix $G(x) \in \mathbb{R}^{n \times m}$. This matrix contains, for example, the information of an underactuation, wherein the system is considered to be underactuated if rank$(G(x))<n$.

The association takes place between the actual control input $u \in \mathbb{R}^k$ and the pseudo-control input $u_p \in \mathbb{R}^m$ via:

$$u_p=Du, \quad \text{Equation (2)}$$

wherein $D \in \mathbb{R}^{m \times k}$ was defined as the control effectiveness matrix (or simply control matrix) for rank$(D)=m$.

Note: A system can be both underactuated and also overdetermined, i.e., in the case of k>m (overdetermined) and rank$(G(x))<n$ (underactuated).

Using laws of state control (for VTOL-MAV, e.g., location, height, position/velocity control, path/trajectory tracking, etc.) a desired pseudo-control input $u_p \in \mathbb{R}^m$ is calculated on the basis of the system dynamics described in equation 1. This has to be calculated via the actual control inputs $u \in \mathbb{R}^k$ $u=[u_1 \ldots u_k]^T$. A type of inverse matrix calculation is therefore necessary to calculate u from the desired $u_p$. This is represented by $$u=D^{-1}(W)u_p, \quad \text{Equation (3)}$$

wherein W is a weighting matrix. The operation $D^{-1}=D^{-1}(W)$ is called allocation matrix or allocating matrix.

For an underactuated MAV it is typical that m=4, i.e., $u_p=[u_t,u_\tau^T]^T \in \mathbb{R}^4$, wherein $u_t$ is the total control thrust and $u_\tau=[\tau_x,\tau_y,\tau_z]^T \in \mathbb{R}^3$ specifies the three control torques which act on the body-fixed frame and around the main body axes. For a Volocopter® MAV from the company of the applicant, k=18, i.e., there are 18 actuators.

The control or regulation problem is defined in that a control input u is calculated so that the regulated states x asymptotically approach the desired states $x^d$, which can be generated on the basis of the pilot inputs (according to a mapping of the pilot inputs or a reference dynamic response) or on the basis of an autopilot.

To increase the level of safety of the flight control system of an aircraft, multiple flight control computers (redundancy) can be used, wherein different control laws can be used in the various flight controllers (to avoid common mode failures).

In the present case—as already mentioned—a possibility of the smooth transition from one controller to another is described, without a controller having to be progressively synchronized with another controller for this purpose. The flight control units used can use different or identical flight control laws here; the present invention covers both options.

In a first refinement of the method according to the invention, it can be provided that step d1) includes: measuring state values of the aircraft, preferably by means of corresponding sensors, and sending the measurement results to initialize the starting values of the movement equation implemented in the newly active flight control unit. A corresponding movement equation was generically specified above as equation 1.

The mentioned implemented movement equation is part of the above-mentioned control implementation and ensures that the specifications of a human pilot or an autopilot are linked to physical states of the aircraft. For the corresponding calculation, it is necessary to specify suitable starting or reference values, which takes place according to the mentioned refinement of the invention in that corresponding state values (or simply states) of the aircraft are measured, for which purpose the aircraft preferably has corresponding sensors, for example location sensors, acceleration sensors, velocity sensors, distance sensors, position sensors, or the like. Another refinement of the method according to the invention can provide that step d1) takes place during the mapping or transfer of control specifications of a human pilot or autopilot in the control implementation of the newly active flight control unit. In other words: step d1) begins where the mentioned control specifications of an (auto) pilot have to be input or read into the newly active flight control unit In the course of still another refinement of the method according to the invention, it can be provided that the following applies for the initialization in step d1): $x_2^{d,init}=x_2(t_s)$, if $x_2^{d,init}$ denotes the state values corresponding to the control specifications and $x_2(t_s)$ denotes the currently known state values of the aircraft at the time of the change, $t_s$. The currently known state values of the aircraft at the time of the change can correspond to the above-mentioned sensor measurement results.

Another refinement of the method according to the invention provides that above-mentioned step d2) includes a transfer of the control commands for the drive units of the currently active flight control unit via a transfer channel to the newly active flight control unit. In this way, the presently current control commands for the drive units are also available to the newly active flight control unit and can advantageously be used in step d2) for initializing integrators.

The use of such integrators in control or regulating methods is known to a person skilled in the art, for example in so-called PID controllers, wherein "I" stands for an integrating controller or an I-element, in which a time integration of a control deviation takes place. In the following, we assume as a general representation of the control law $$u_p=K(x)+I$$

wherein $K(x)$ is the static part of the controller. A corresponding refinement of the method according to the invention provides that for the initialization in step d2): $I_2^{init}=Du_1(t_s)$ applies at the time of the change, $t_s$, if $D, D \in \mathbb{R}^{m \times k}$ denotes a control matrix, which control matrix links actual control commands $u \in \mathbb{R}^k$ and pseudo-control commands $u_p \in \mathbb{R}^m$ according to $u_p=Du$, $m, k \in \mathbb{N}$. The mentioned control matrix and its physical relationships were already described in detail above.

To refine the embodiment discussed above of the method according to the invention, it can accordingly be provided that for the initialization in step d2), $I_2^{init}=Du_1(t_s)$ at the time of the change, $t_s$, is reduced by $K(x_2(t_s))$, thus $I_2^{init}=Du_1(t_s)-K(x_2(t_s))$, wherein $K(x_2(t_s))$ denotes pseudo-control commands of the newly active flight control unit without the above-mentioned integrators. In this way, $K(x_2(t_s))$ denotes the pseudo-control commands of the newly active flight control unit without the integrator terms, that is to say the static thrust and static torques.

To make the desired transition as uniform as possible, still another refinement of the method according to the invention provides that a weighting of the difference equalization in step d3) decreases with time, preferably exponentially. In this way, the control behavior of the aircraft approaches the desired new control implementation more and more with increasing time.

Specifically, this can mean that a corresponding refinement of the method according to the invention includes the use of the following modified actual control commands $u_2'$ of the newly active flight control: $u_2'(t)=u_2(t)+\Delta u$, $\Delta u=(u_1(t_s)-u_2(t_s))e^{-\lambda t}$, $\lambda>0$, wherein $u_1(t_s)$ specifies the actual control commands of the currently active flight control unit and $u_2(t_s)$ specifies the actual control commands of the newly active flight control unit which are present at the switching or changing time $t_s$.

It has proven to be particularly advantageous if, in the course of the difference equalization in step d3), it is also ensured that no undesired torques or thrusts occur due to the difference equalization. For this purpose, an extremely preferred refinement of the method according to the invention can provide that instead of $\Delta u$, a projection $\Delta u'$ on the zero space is used, so that the state of the aircraft does not change. The zero space is understood (in overdetermined systems) as those solutions of the movement equations in which the overall result of the movement, for example the location and the movement of the distal end of a robot arm in space, does not change, although the system as a whole (for example thus the robot arm as such) can certainly execute movements In the scope of a specific implementation of the above-described method, the following can apply: $\Delta u'=N_2\Delta u$ where $N_2=I-D_2^T(D_2^{-1})^T$, if $D, D \in \mathbb{R}^{m \times k}$, denotes a control matrix, which control matrix links actual control commands $u \in \mathbb{R}^k$ and pseudo-control commands $u_p \in \mathbb{R}^m$ according to $u_p=Du$, where $m, k \in \mathbb{N}$.

It has already been mentioned that it can be advantageous for reasons of operational reliability, if the first flight control unit and the second flight control unit use different allocations $u=D^{-1}u_p$, if $D, D \in \mathbb{R}^{m \times k}$, denotes a control matrix, which control matrix links actual control commands $u \in \mathbb{R}^k$: and pseudo-control commands $u_p \in \mathbb{R}^m$ according to $u_p=Du$, where $m, k \in \mathbb{N}$. A corresponding refinement of the method according to the invention accordingly provides that the first flight control unit and the second flight control unit are designed or configured accordingly.

For the same purpose, it can also be provided in one advantageous refinement of the method according to the invention that the first control implementation is different from the second control implementation, which can mean that differently formulated physical laws can be used as the basis for the control.

In one refinement of the flight control device according to the invention, it can be provided that it is furthermore designed to carry out the method according to the invention or one of its embodiments.

In this way, the present invention enables the uniform transition from one flight control unit to another flight control unit in a variety of ways, without an error propagation being able to occur in this context in the scope of a continuous synchronization between the flight control units.

BRIEF DESCRIPTION OF THE DRAWINGS

Further properties and advantages of the invention result from the following description of exemplary embodiments on the basis of the drawings.

DETAILED DESCRIPTION

Figure 1:
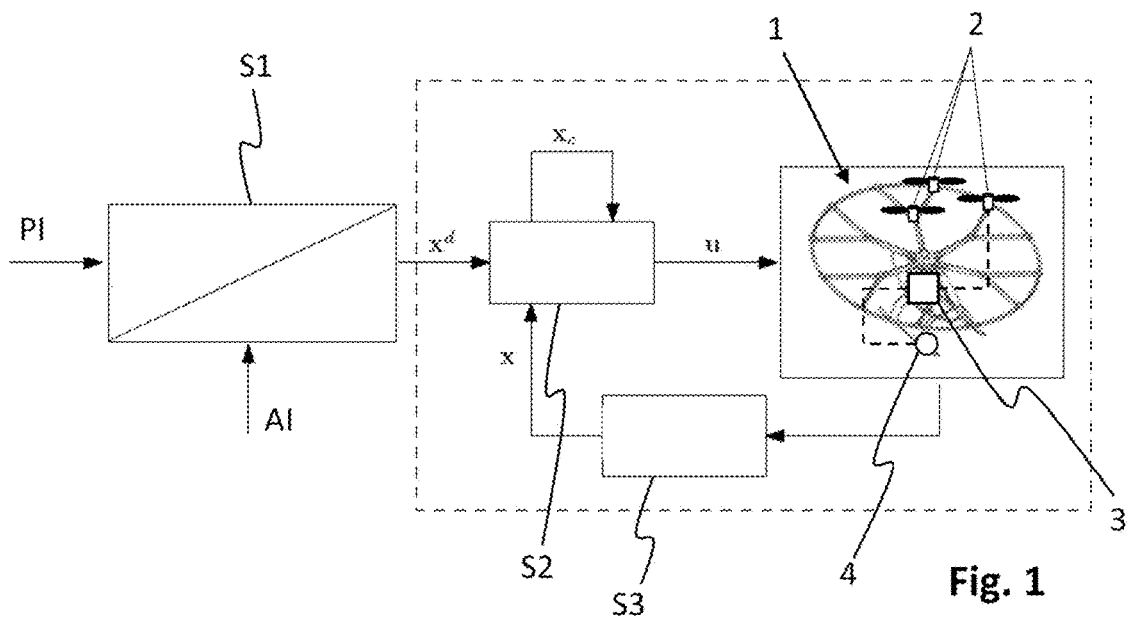
FIG. 1 shows a generic control loop for a flight control unit; in addition, an exemplary aircraft is shown.

FIG. 1 shows a generic control loop as can be used during operation of an aircraft having multiple drive units. The aircraft is shown in FIG. 1 at reference sign 1. In the present case, it is without restriction a VTOL aircraft having multiple electrical motor driven drive units (rotors), of which only a few are explicitly shown in FIG. 1 at reference sign 2. According to the dashed line in FIG. 1, the drive units 2 are supplied with suitable control signals, in the present case, for example, with motor control commands, by at least one flight control unit or controller 3. In addition, a sensor is also shown by way of example in FIG. 1 at reference sign 4, using which a physical (actual) state of the aircraft 1 can be metrologically determined at any time. The sensor 4 supplies its sensor signal or its measurement results to the flight control unit 3, as shown in FIG. 1. In this way, the flight control unit 3 "knows" at all times the physical state of the aircraft or is capable of making corresponding predictions to suitably activate the drive units 2.

This is schematically shown in FIG. 1: in step S1, desired state vectors $x^d$ are generated on the basis of pilot inputs PI or corresponding specifications AI of an autopilot on the basis of a physical state or movement equation of the aircraft 1 and, in step S2, they are processed in the flight controller which is ensured by the flight control unit 3. In FIG. 1, reference sign $x_c$ denotes internal states of the flight control unit 3, which also include the above-mentioned control integrators. The flight controller according to step S2 generates motor control commands u for the aircraft 1 or its drive units 2. In step S3, the physical actual state of the aircraft 1 is determined, for example, on the basis of the mentioned measurement results of the sensors 4 and fed back to the flight control in step S2. Accordingly, in FIG. 1 reference sign x denotes a state (state vector) of the aircraft 1 thus ascertained.

The sequences shown in FIG. 1 are fundamentally known to a person skilled in the art and are used in this way in all comparable aircraft 1.

Figure 2:
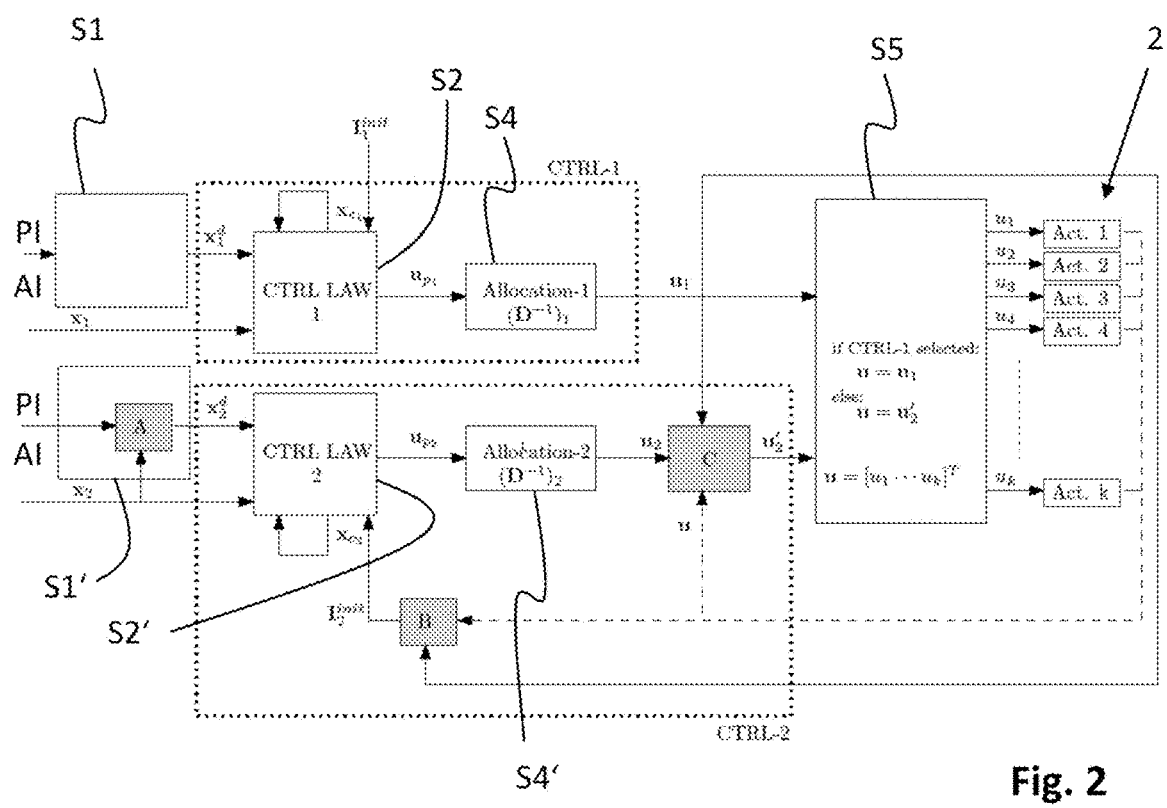
FIG. 2 schematically shows an overview of the overall flight control for an aircraft having two flight control units, which each implement one flight control law.

FIG. 2 shows in detail how an overall flight control can be implemented in the scope of the present invention using two flight control units, wherein each of the flight control units implements a separate flight control law—preferably in a different programming manner, in each case on the basis of a separate control implementation. In FIG. 2, the first flight control unit or the control method running thereon is identified by CTRL-1. Accordingly, the reference sign CTRL-2 denotes corresponding sequences in the second flight control unit. Otherwise, with respect to FIG. 1, identical reference signs stand for identical or at least identically acting elements or functions. To distinguish the respective sequences, in FIG. 2, sequences in the second flight control unit (CTRL-2) are simply shown by dashed lines. In addition, reference signs or variables having index "1" denote values or commands in conjunction with the flight control unit CTRL-1, while such specifications having index "2" relate to the second flight control unit CTRL-2. In addition, the case is shown in FIG. 2 that the first flight control unit CTRL-1 represents a so-called primary flight control unit which is used in normal operation of the aircraft 1 (cf. FIG. 1). In contrast, the second flight control unit CTRL-2 represents a secondary flight control unit which is switched to as needed—for example if the first flight control unit CTRL-1 obviously or presumably does not operate correctly. Accordingly, implementation blocks A-C, which are used to switch the operation from the first flight control unit CTRL-1 to the second flight control unit CTRL-2 are arranged in the region of the second flight control unit CTRL-2. However, the invention is in no way restricted to such an embodiment; rather, the corresponding blocks can also be arranged inside the first flight control unit CTRL-1. Moreover, an embodiment is possible in which both or all flight control units have corresponding blocks A-C. Finally, there is also the possibility of arranging the blocks A-C centrally, so that all flight control units can have access thereto if needed. In step S5 or a correspondingly designed selection logic, the selection of the control commands takes place, which are ultimately relayed to the drive units or in general to actuators of a system—for example in the course of monitoring of the function of the primary flight control unit. These drive units or actuators are denoted in FIG. 2 with Act.1 to Act.k if the aircraft has k drive units (or the system has k actuators). The corresponding control commands are denoted by $u_1$ to $u_k$.

If CTRL-1 is the active flight control unit, the following applies for the control commands: $u=u_1$. Otherwise $u=u_2'$ applies for the control commands, wherein the control commands $u_1$ originate from the first flight control unit CTRL-1, while the control commands $u_2'$ originate from the flight control unit CTRL-2 or the block C contained therein, which will be discussed in more detail now.

Figure 3:
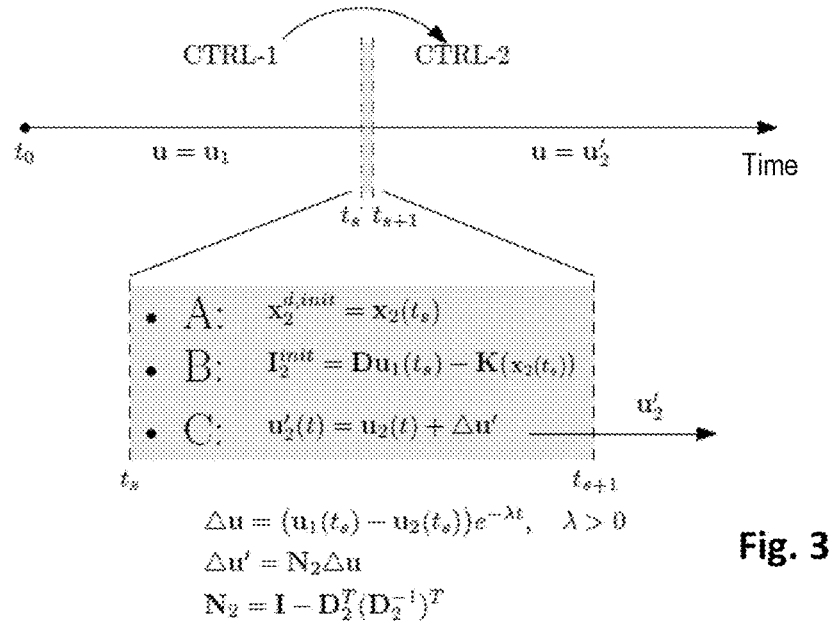
FIG. 3 shows the process of switching over from one flight control unit to another between the times $t_s$ and $t_{s+1}$ with reference to blocks A, B, and C in FIG. 2.

The precise embodiment and functionality of the blocks A to C is shown in FIG. 3. The block A is arranged or active inside step S1' and ensures initialization of the target state values for CTRL LAW 2 (i.e., the implementation of the flight control law in the flight control unit CTRL-2) in step S2'. Correspondingly, block A receives the (measured) actual values of the aircraft at the switching time $t_s$ and initializes the target values accordingly. This is also indicated by formulas in FIG. 3.

Block B is arranged inside the actual flight controller or flight control unit CTRL-2. It ensures an initialization of the controller integrators for CTRL LAW 2 in step S2'. For this purpose, block B is operationally connected to the individual drive units and receives therefrom the presently applied control commands at the switching time $t_s$, which still originate from the first flight control unit CTRL-1. A first initialization term $Du_1(t_s)$ results therefrom. Block B corrects this first term using the pseudo-control commands from CTRL-2 at the switching time $t_s$, but without the integrator terms. This results in a correction term $K(x_2(t_s))$, which thus only includes static thrust and static torques. Finally, block C ensures a seamless transition of the control commands in that it ensures an equalization of the control commands of the flight control units CTRL-1 and CTRL-2 at the switching time $t_s$. This takes place by means of the implementation specified in FIG. 3. Accordingly, the control commands $u_2$ calculated by CTRL-2 are corrected using a correction term $\Delta u'$, so that corrected control commands $u_2'$ result. To calculate the term $\Delta u'$, first a term $\Delta u$ is calculated, which results from the difference of the control commands $u_1$ and $u_2$ at the switching time $t_s$. This difference is multiplied by a factor $e^{-\lambda t}$ decreasing exponentially over time, as shown. The term $\Delta u$ thus calculated is subsequently also projected on the zero space, so that the term $\Delta u'$ results.

"Projected on the zero space" means that the control commands linked to the correction term $\Delta u$ do not cause a change of the global thrust or the global torques of the aircraft, even if a change of the activation of the drive units can be linked thereto in detail. This is known correspondingly from robot technology, for example, where the robot arm can certainly execute movements of its joints while the end effector (the hand) of the robot arm remains unmoving, however. In FIG. 3, a specific embodiment of such a projection $\Delta u'=N_2 \ \Delta u=(I-D_2^T(D_2^{-1})^T)\Delta u$ is specified, wherein I indicates the unity matrix here.

While the initializations in block A and B only have to be performed once at the switching time $t_s$, the equalization in block C advantageously takes place continuously over time. However, it is to be taken into consideration here that due to the exponential decrease of the correction term $\Delta u$, the correction can be omitted from a certain time, as soon the correction term falls below a specific threshold value.

Figure 4:
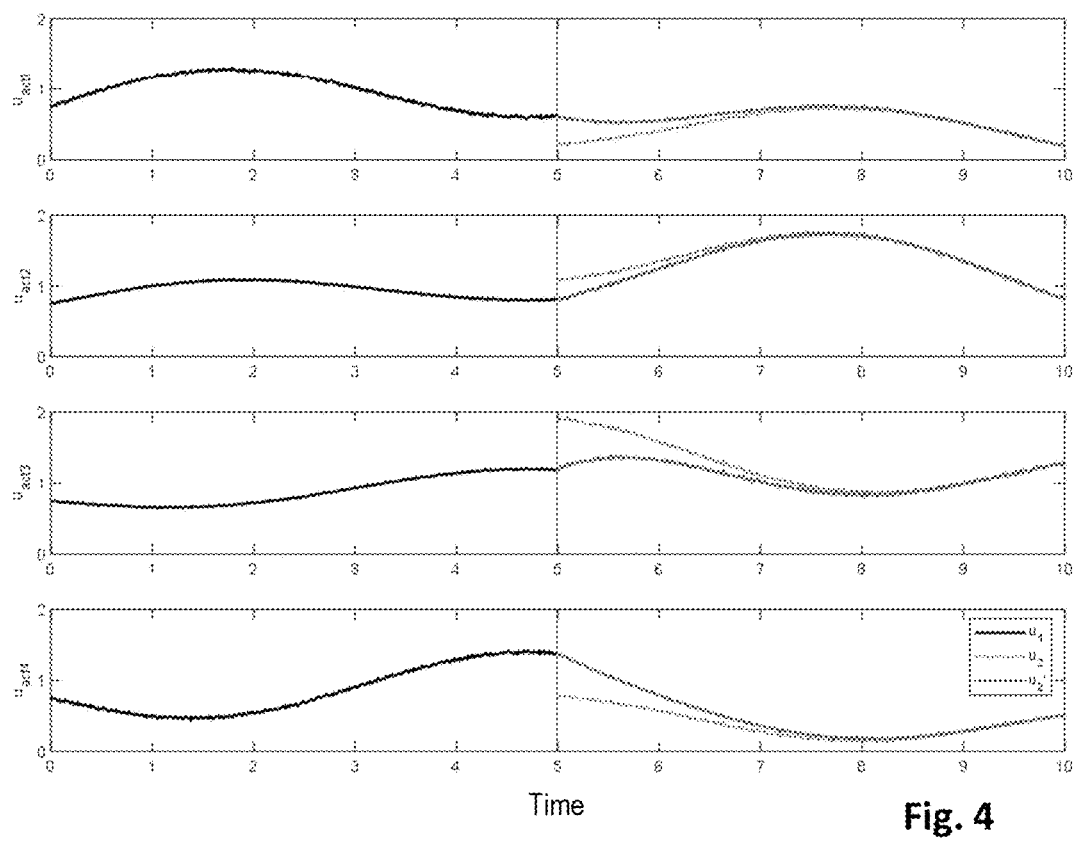
FIG. 4 shows by way of example the transition of the motor control signal during a switching process for an aircraft having four rotors according to the algorithm in Block C in FIG. 3.

FIG. 4 now shows by way of example, on the basis of an aircraft having four drive units or a system having four actuators, the behavior of the control commands upon the switching from one (flight) control unit to another (flight) control unit. According to FIG. 4, the switching takes place at time $t_s=5$ (abscissa), while the control commands for the individual drive unit or actuators are each specified on the ordinate (denoted in FIG. 4 with $u_{Act1}-u_{Act4}$). Up to the time $t=5$, the control commands originate from CTRL-1 (cf. FIG. 2), while they originate from CTRL-2 from $t=5$. From time $t=5$, the control commands are shown by dashed lines, as they have been supplied without equalization by the control unit CTRL-2. This would result in an erratic behavior at the switching time $t_s=5$, which is generally undesired. The solid line $u_2'$ from the switching time $t_s=5$ indicates the motor commands which were changed by means of block C (cf. FIGS. 2 and 3). A seamless transition results here from the control commands $u_1$ to the control commands $u_2'$. As can also be inferred from FIG. 4, the course of the control commands $u_2$ approaches the course of the control commands $u_2'$ over time, until a deviation is no longer recognizable approximately at $t=8$. This is caused by the exponentially decreasing correction term in $\Delta u$ according to FIG. 3, which was already mentioned.

It has also already been mentioned that the use of the present invention is not restricted to aircraft having four drive units (and at all to a predetermined, defined number of drive units) or to aircraft per se. Rather, the invention can be used in all types of systems in which a plurality of actuators are activated in a manner adapted to one another.

A special embodiment of the invention is described once again in summary hereinafter on the basis of an aircraft having a plurality of actuators in the form of drive units (motors):

If the primary flight control unit CTRL-1 does not function well (or is not capable of controlling the aircraft), CTRL-2 is to take over the task of CTRL-1. Both CTRL-1 and CTRL-2 are designed to control an aircraft having the number "k" of actuators ($u \in \mathbb{R}^k$), see above. It is to be noted:

CTRL-1 and CTRL-2 can implement different (flight) control laws, i.e., CTRL LAW 1 is different from CTRL LAW 2, and Allocation-1 is different from Allocation-2, cf. FIG. 2.

CTRL-1 generates the vector $u_1 \in \mathbb{R}^k$, and CTRL-2 generates the vector $u_2 \in \mathbb{R}^k$.

For the switching from CTRL-1 to CTRL-2, a selection logic (depending, for example, on the health status of CTRL-1) is implemented, i.e., the actuators accept the commands $u_2$ instead of $u_1$ after switching.

This switching is to take place as smoothly as possible for reasons of stability and good handling quality. Moreover, a direct synchronization between the controllers (flight control units) is avoided according to the invention for safety reasons.

It is presumed that the state of the aircraft known to the two flight control units ($x_1$ or $x_2$) is similar ($x_1 \approx x_2$). It is to be noted that this assumption is reasonable since the aircraft has a "real" physical state and various sensors and algorithms are present to estimate/measure this state as well as possible.

Each flight control unit can have its own internal state, for example, $x_{c1}$ and $x_{c2}$ for CTRL-1 and CTRL-2, respectively, wherein each of the flight control units can contain control integrators.

The following points are preferably to be taken into consideration (cf. FIG. 2) for a smooth transition from CTRL-1 to CTRL-2 without a synchronization:

A: Initializing the desired inputs $x_2^d$, which can be the mapping of the control inputs of the pilot, the outputs of a reference dynamic response, and/or the outputs of an autopilot.

B: Initializing the control integrators $I_2^{init}$, e.g., for location, height, and horizontal position control, if present. Control integrators are used to counteract system unknowns, e.g., external disturbances, parametric uncertainties (mass, center of gravity shift, moment of inertia, etc.).

C: Desired control element or actuator commands $u_2$. In particular in overdetermined systems (k>m), the solution of the assignment problem can be ambiguous, i.e., different solutions for $u_2$ can result in identical $u_{p_2}$. The invention avoids jumps upon the transition from $u_1$ to $u_2$ (which can otherwise occur if Allocation-1 is different from Allocation-2 and the system is overdetermined).

If a transition from CTRL-1 to CTRL-2 is to take place at time $t_s$, in this case the following actions are executed for this purpose in CTRL-2 or in blocks A to C (see FIG. 3):

A: The starting values of the reference dynamic response are set to the last known aircraft states. This is important for a smooth transition on the side of the reference dynamic response. This takes place during the pilot input mapping (if the aircraft is controlled by a human pilot) or in the autopilot part.

B: The integrators are initialized using the newest motor commands from CTRL-1 ($u_1$). These motor commands (or the actually ordered motor states, depending on the availability of the motor data) are provided to CTRL-2 via a communication channel. The control effectiveness matrix D is the same for CTRL-1 and CTRL-2, since both flight control units attempt to control the same actuators, their positions and properties, thus the type of the underlying flight control law, do not change. It is also to be noted that $Du_1$ calculates the pseudo-command from CTRL-1, and that $K(x(t_s))$ denotes the pseudo-control commands from CTRL-2 with exception of the integrator terms (i.e., static thrust and torques).

C: The difference between the motor commands of CTRL-1 and CTRL-2 is calculated, which is multiplied by a function decreasing exponentially over time. In addition, this difference is projected on the zero space of the CTRL-2 assignment (allocation) to ensure that the calculation taking place in this step does not generate undesired torques and thrusts. Finally, the final version of the difference (which decays exponentially and is projected on the zero space) is added to the motor commands originally calculated by CTRL-2.

The invention claimed is:

1. A method for operating an aircraft having multiple drive units, the method comprising:
   a) providing a first flight control unit that activates the drive units according to a first control implementation when the first flight control unit is active;
   b) providing a second flight control unit that activates the drive units according to a second control implementation when the second flight control unit is active;
   c) continuously monitoring a function of a currently active one of the first and second flight control units;
   d) changing an active flight control unit from the currently active one of the first and second flight control units to a newly active one of the first and second flight control units in dependence on a result of the monitoring in step c);
   wherein the changing in d) for the newly active one of the flight control units includes:
   d1) initializing starting values of a movement equation of the aircraft implemented in the newly active one of the flight control unit using currently known state values (x) of the aircraft;
   d2) initializing integrators of the newly active flight control unit using control commands for the drive units from the currently active flight control unit; and
   d3) difference equalization between control commands ($u_1$) for the drive units from the currently active one of the flight control units and control commands ($u_1$) for the drive units from the newly active one of the flight control units.

2. The method as claimed in claim 1, wherein
   in step d1), the initializing starting of the values of the movement equation of the aircraft implemented in the newly active one of the flight control unit is carried out once at the time of the change ($t_s$);
   in step d2), the initializing of the integrators of the newly active flight control unit using the control commands for the drive units from the currently active flight control unit is carried out once at the time of the change ($t_s$); and
   in step d3), the difference equalization between the control commands ($u_1$) for the drive units from the currently active flight control unit and control commands ($u_1$) for the drive units from the newly active flight control unit are carried out from the time of the change ($t_s$) with weighting decreasing over time (t).

3. The method as claimed in claim 1, wherein step d1) includes:
   measuring state values (x) of the aircraft using corresponding sensors, and using the measurement results for initializing the starting values of the movement equation implemented in the newly active flight control unit.

4. The method as claimed in claim 1, wherein step d1) takes place during a mapping/transfer of control specifications of a human pilot (PI) or an autopilot (AI) into a control implementation of the newly active flight control unit.

5. The method as claimed in claim 4, in wherein for the initializing in step d1):
   $x_2^{d,init} = x_2(t_s)$ applies, if $x_2^{d,init}$ denotes the state values corresponding to the control specifications and $x_2(t_s)$ denotes the currently known state values of the aircraft at a time of the change, $t_s$.

6. The method as claimed in claim 1, wherein step d2) includes:
   transferring the control commands ($u_1$) for the drive units of the currently active flight control unit to the newly active flight control unit via a transfer channel.

7. The method as claimed in claim 1, wherein for the initializing in step d2): $I_2^{init} = Du_1(t_s)$ applies at a time of the change, $t_s$, if D, $D \in \mathbb{R}^{m \times k}$, denotes a control matrix that links actual control commands $u \in \mathbb{R}^k$ and pseudo-control commands $u_p \in \mathbb{R}^m$ according to $u_p = Du$, m, k $\in \mathbb{N}$.

8. The method as claimed in claim 7, wherein for the initializing in step d2), $I_2^{init} = Du_1(t_s)$ applies at the time of the change, $t_s$, is reduced by $K(x_2(t_s))$, thus $I_2^{init} = Du_1(t_s) - K(x_2(t_s))$, wherein $K(x_2(t_s))$ denotes pseudo-control commands of the newly active flight control unit without the integrators.

9. The method as claimed in claim 1, wherein a weighting of the differential equalization decreases exponentially with time (t).

10. The method as claimed in claim 1, wherein step d3) includes: $u_2'(t) = u_2(t) + \Delta u'$, $\Delta u = (u_1(t_s) - u_2(t_s))e^{-\lambda t}$, $\lambda > 0$, wherein $u_1$ specifies actual control commands of the currently active one of the flight control units and $u_2'$ specifies actual control commands of the newly active one of the flight control units.

11. The method as claimed in claim 10, wherein instead of $\Delta u$, a projection $\Delta u'$ on the zero space is used, so that a state of the aircraft does not change.

12. The method as claimed in claim 11, wherein: $\Delta u' = N_2 \Delta u$ where $N_2 = I - D_2^T(D_2^{-1})^T$ applies if D, $D \in \mathbb{R}^{m \times k}$, denotes a control matrix that links the actual control commands $u \in \mathbb{R}^k$ and pseudo-control commands $u_p \in \mathbb{R}^m$ according to $u_p = Du$, m, k $\in \mathbb{N}$.

13. The method as claimed in claim 1, wherein the first flight control unit and the second flight control unit use different allocations $u = D^{-1}u_p$, if D, $D \in \mathbb{R}^{m \times k}$ denotes a control matrix that links actual control commands $u \in \mathbb{R}^k$ and pseudo-control commands $u_p \in \mathbb{N}^m$ according to $u_p = Du$, where m, k $\in \mathbb{N}$.

14. A flight control device for an aircraft having multiple drive units, the flight control device comprising:
   a) a first flight control unit configured to activate the drive units according to a first control implementation when the first flight control unit is active;
   b) a second flight control unit configured to activate the drive units according to a second control implementation when the second flight control unit is active;
   c) a monitoring unit for continuously monitoring a function of a currently active one of the first or second flight control units;
   d) a control-engineering implementation for changing an active flight control unit from the currently active one of the flight control units to a newly active one of the flight control units in dependence on a monitoring result of the monitoring unit;
   wherein the control-engineering implementation includes:
   d1) a first implementation block that is designed for initializing starting values of a movement equation of the aircraft implemented in the newly active one of the flight control units using currently known state values (x) of the aircraft;
   d2) a second implementation block that is designed for initializing integrators of the newly active one of the flight control units using control commands ($u_1$) for the drive units from the currently active one of the flight control units; and
   d3) a third implementation block that is designed for a difference equalization between the control commands ($u_1$) for the drive units from the currently active one of the flight control units and the control commands ($u_2$) for the drive units from the newly active one of the flight control units.

15. The flight control device as claimed in claim 14, wherein
the first implementation block is designed for initializing the starting values of the movement equation of the aircraft implemented in the newly active one of the flight control units using currently known state values (x) of the aircraft once at the time of change ($t_s$);
the second implementation block is designed for initializing the integrators of the newly active one of the flight control units using the control commands ($u_1$) for the drive units from the currently active one of the flight control units once at the time of change ($t_s$); and
the third implementation block is designed for carrying out the difference equalization between the control commands ($u_1$) for the drive units from the currently active one of the flight control units and the control commands ($u_2$) for the drive units from the newly active one of the flight control units continuously from the time of the change ($t_s$).

16. The flight control device as claimed in claim 15, wherein the difference equalization is carried out with weighting decreasing over time (t).

17. An aircraft comprising multiple drive units and the flight control device as claimed in claim 14.

18. An aircraft comprising multiple drive units operating according to the method as claimed in claim 1.

* * * * *